(12) United States Patent
Brayton

(10) Patent No.: US 12,394,288 B2
(45) Date of Patent: Aug. 19, 2025

(54) NOTIFICATION AND ALERT METHOD FOR WEARABLE AND/OR OTHER DEVICES

(71) Applicant: Darryl Dwight Brayton, Richland, WA (US)

(72) Inventor: Darryl Dwight Brayton, Richland, WA (US)

( * ) Notice: Subject to any disclaimer, the term of this patent is extended or adjusted under 35 U.S.C. 154(b) by 0 days.

(21) Appl. No.: 18/408,152

(22) Filed: Jan. 9, 2024

(65) Prior Publication Data

US 2024/0378973 A1 Nov. 14, 2024

Related U.S. Application Data

(63) Continuation-in-part of application No. 17/701,602, filed on Mar. 22, 2022, now Pat. No. 11,869,342, which is a continuation-in-part of application No. 17/014,367, filed on Sep. 8, 2020, now Pat. No. 11,282,348, which is a continuation-in-part of application No. 16/791,565, filed on Feb. 14, 2020, now Pat. No. 11,080,972, which is a continuation of application No. 16/168,109, filed on Oct. 23, 2018, now Pat. No. 10,565,836, which is a continuation-in-part of application No. 15/407,522, filed on Jan. 17, 2017, now Pat. No. 10,109,164, (Continued)

(51) Int. Cl.
| | | |
|---|---|---|
| G08B 7/06 | (2006.01) | |
| G08B 1/08 | (2006.01) | |
| H04H 20/71 | (2008.01) | |
| H04H 60/13 | (2008.01) | |
| H04L 12/18 | (2006.01) | |
| H04L 51/10 | (2022.01) | |
| H04L 51/58 | (2022.01) | |
| H04W 4/14 | (2009.01) | |
| H04W 72/02 | (2009.01) | |

(52) U.S. Cl.
CPC ............... *G08B 7/06* (2013.01); *G08B 1/08* (2013.01); *H04H 20/71* (2013.01); *H04H 60/13* (2013.01); *H04L 12/1895* (2013.01); *H04L 51/10* (2013.01); *H04W 4/14* (2013.01); *H04W 72/02* (2013.01); *H04L 51/58* (2022.05)

(58) Field of Classification Search
CPC . G08B 7/06; G08B 1/08; H04H 20/71; H04H 60/13; H04L 12/1895; H04L 51/10; H04L 51/58; H04L 12/1845; H04L 67/12; H04L 67/55; H04W 4/14; H04W 72/02
See application file for complete search history.

(56) References Cited

U.S. PATENT DOCUMENTS 8,238,869 B2 * 8/2012 Brayton ............... G08B 25/009
455/404.1
10,109,164 B2 * 10/2018 Brayton .................. G10L 15/26
(Continued)

*Primary Examiner* — John A Tweel, Jr.
(74) *Attorney, Agent, or Firm* — Eugenio J. Torres-Oyola; Victor M. Rodriguez-Reyes; Rafael Rodriguez-Muriel

(57) ABSTRACT

A method and system for communicating and delivering geo-coded alerts, notifications, and messages, based on a service-less communications device that has an internal GPS locator, utilizing both one to many primary communication channels and one to many non-primary communication pathways enabled, from one-to-many service-less wearable communication devices to one-to-many service-provided devices, such as SmartPhones, is disclosed.

7 Claims, 2 Drawing Sheets

Related U.S. Application Data which is a continuation-in-part of application No. 14/251,454, filed on Apr. 11, 2014, now Pat. No. 9,955,264.

(60) Provisional application No. 62/279,768, filed on Jan. 17, 2016, provisional application No. 61/810,712, filed on Apr. 11, 2013.

(56) References Cited

U.S. PATENT DOCUMENTS

| | | | |
|---|---|---|---|
| 10,909,830 B1 * | 2/2021 | Stapleford | H04W 4/90 |
| 10,977,927 B2 * | 4/2021 | Katz | G08B 19/00 |
| 11,279,481 B2 * | 3/2022 | Burks | H04W 4/44 |

* cited by examiner

NOTIFICATION AND ALERT METHOD FOR WEARABLE AND/OR OTHER DEVICES

RELATED APPLICATIONS

This application claims priority from and is a continuation-in-part of U.S. application Ser. No. 17/701,602, filed on Mar. 22, 2022, which claims priority from and is a continuation-in-part of U.S. application Ser. No. 17/014,367, filed on Sep. 8, 2020, which claims priority from and is a continuation-in-part of U.S. application Ser. No. 16/791,565, filed on Feb. 14, 2020, which claims priority from and is a continuation of U.S. application Ser. No. 16/168,109, filed on Oct. 23, 2018, which claims priority from and is a continuation-in-part of U.S. application Ser. No. 15/407,522, filed on Jan. 17, 2017, which claims priority from U.S. Provisional Application Ser. No. 62/279,768, filed on Jan. 17, 2016, which claims priority from U.S. application Ser. No. 14/251,454, filed on Apr. 11, 2014, which claims priority from U.S. Provisional Application Ser. No. 61/810,712, filed on Apr. 11, 2013. The entire collective teachings thereof being herein incorporated by reference.

BACKGROUND OF THE DISCLOSURE

Field of the Disclosure

The field of the invention is devices and methods for personal or group alert, notification and messaging and/or device-based alert, notification and messaging.

Background of the Invention

With today's advanced technologies, one can actually be integrated with other people in a community on-line via the Internet or by Local Area Network (LAN), yet still be isolated from being secure and safe, even if equipped with the most advanced iPhones and other smart phones and/or devices. Many families, especially within the current economic conditions do not have the means to provide for these communication devices, like smart phones, for all family members, especially at the costs to acquire the phones and maintain monthly costs for service access. This is especially true for the most vulnerable in a family the younger children. And even if you do have these devices, there are still risks involved even in what we feel are the safest places.

To cite a recent incident, a kidnapping took place when a 9-year-old girl riding her bike in Moreau Lake State Park in New York State in September 2023, while camping with her family in a supposedly safe and secure place, was kidnapped. Thankfully, the young girl was recovered safely but it took days and intensive resources to locate the perpetrator and return the girl. Sometimes the outcome is not always so fortunate. And even if messaging apps could be utilized in such a circumstance, assuming the kidnapped victim had a smart phone, the first item removed from the victim, destroyed and ditched would certainly be said phone to avoid tracking via cell towers. What is needed is an extremely efficient method to alert not only the parents but also the authorities of the situation in a relatively simple to use process that is cost effective.

As for devices on the market today, the Roku's® smart box/home devices come closest to addressing the problem that the Boxy process aims to solve, but there are significant differences that set the Boxy process apart. Roku Inc. is an in-home streaming entertainment company with a specialization in smart-home environments. Rather than focusing on streaming, the Boxy process focuses on seamless messaging between devices that contain Boxy components, either applications and/or devices. The main similarity is that both the Boxy and Roku processes are both services that center around providing homes/facilities with a single, convenient device that will be able to create a unified system in a cheap and affordable manner. Another similarity would be that Roku and Boxy processes are both one-time payment devices that allow access to their services. Neither service requires the user to buy a subscription-based package on top of paying for the physical device itself in order to gain services. The Roku box process focuses on providing streaming services such as Hulu, Netflix, etc., while the Boxy process will provide the user with a hub for messaging, tracking, emergency broadcasts, and more. Some other similar devices/systems to the Roku process would be from companies such as LG, Vivint, and Google Home. In terms of pure messaging the Boxy process has unique benefits compared to its competitors in the sense that it is much cheaper than buying a smartphone to communicate/message and can be used for both emergencies and non-emergency purposes, and can be used to potentially help supervise employees and young children, and more, especially with the previously claimed methods of primary and non-primary channel delivery with cut-in on a priority basis.

Application US2016330538 by Eskenas, titled Audio Interrupter Alertness Device for Headphones, attempts to solve some of the problems recited above. Eskenas discloses an audio interrupter device that interfaces between an audio source and headphones to momentarily stop sound transmission to alert the user of an external sound above a threshold. However, this method does not perform encoding and decoding of data into an alert, notification or message to communicate through a non-primary channel; that is, its method does not anticipate having processors and/or functions that process commands, and then directly pass text-to-speech or allow live text feeds to be interpreted and then broadcasted as voice, text, vibration, or other sensory output, or allow synchronized interruption with transmission of audible voice or tones, text, or other sensory output on the primary and/or non-primary channel(s). Further, this method does not anticipate a user-generated response, either. These Eskenas devices currently do not perform encoding and decoding of data into an alert, notification or message to communicate the same through a primary and/or non-primary communications channel; that is, they do not have processors and/or functions that process commands, and then directly pass text-to-speech or allow live text feeds to be interpreted and then broadcasted as voice, text, vibration, or other sensory output, or allow synchronized transmission of geo-coded audible voice or tones, text, or other sensory output on the primary and/or non-primary channel(s).

From the continuation of the previous patent applications, it has been established that cut-in communications can be established from the sending device to the notification device by means of a text-to-speech, audio file, or text message cut-in on a primary channel(s) or non-primary channel(s). The implementation now puts this method and smart phone functional aspects in a relatively inexpensive device with Bluetooth and/or WiFi with GPS module (system on a chip i.e., SOC) that, once connected to a network or Smart Phone cellular 'hot-spot' or other communications network, establishes a geo-coded two way connection necessary to implement the previous patents' utility of notifying and alerting another smart phone and other communication channels such as 9-1-1, through a local and/or remote communications channel but with an additional meta-data that is a geo-code of location, with time stamp as the preferred method. This device and utility process is referred to herein as 'Boxy™'.

SUMMARY OF THE DISCLOSURE

A method and system for communicating and delivering geo-coded alerts, notifications, and messages, based on a communications device that has an internal GPS locator, utilizing both one to many primary communication channels and one to many non-primary communication pathways enabled, that does not require cellular service is disclosed.

A camera image snapshot taken at the time of the event and live audio stream from the event location, as available, are also sent separately to the service-provided device. A priority-override channel is available to both connected but not-engage wearable media devices and also non-connected wearable media devices through a special priority override channel through local communications such as Bluetooth and WiFi access points.

DETAILED DESCRIPTION OF THE INVENTION

Figure 1:
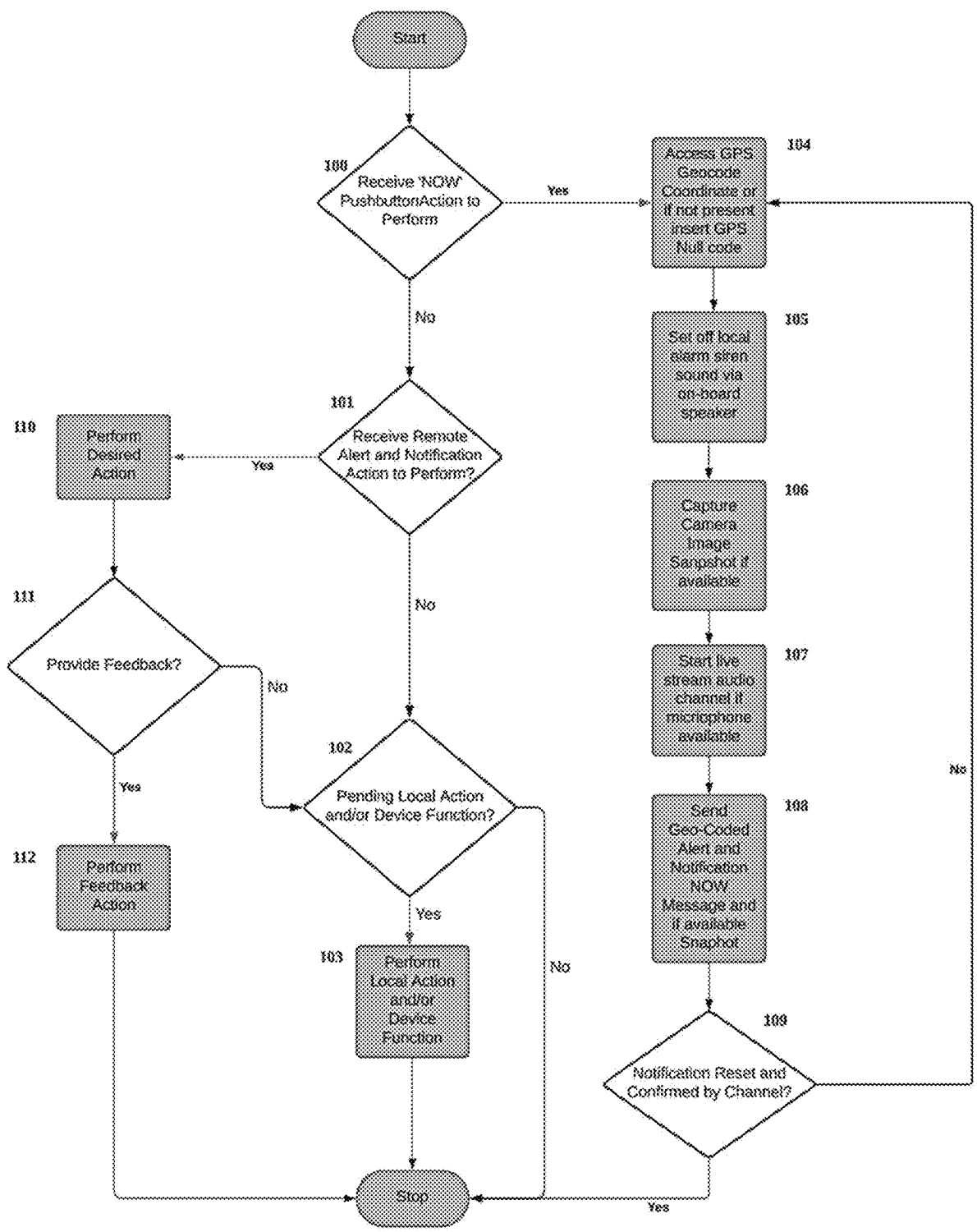
FIG. 1 shows an exemplary flowchart of different methods of use for a Boxy wearable device, as possible given methods of geo-coded delivery for the present disclosure.

A method and system for communicating and delivering geo-coded alerts, notifications, and messages, based on a service-less communications device that has an internal GPS locator, utilizing both one to many primary communication channels and one to many non-primary communication pathways enabled, is disclosed.

From the continuation of the previous patent applications, it has been established that cut-in communications can be established from the sending device to the notification device by means of a text-to-speech, audio file, or text message cut-in on a primary channel(s) or non-primary channel(s). The implementation now puts this method and smart phone functional aspects in a relatively inexpensive device. This device and utility process is referred to herein as 'Boxy™'.

There are two key components to the overall Boxy process. A Boxy application, that resides on at least one SmartPhone, such as an Apple iPhone or Android phone, to allow pairing and communication with at least one wearable communication device called a Boxy Device. Note the that Boxy device may contain the GPS device and directly communicate this to said SmartPhone. In this way a precise location is provided to the Smartphone for further actions. In the case where the Boxy does not contain the GPS device or the GPS device for whatever reason is out of service in the Boxy, the SmartPhone may supplement with its own GPS location although precision would be reduced by up to several meters at least. Please note this nomenclature in future discussions in the utility application. A pragmatic implementation of a Boxy Device is utilizing a Raspberry PI Zero with Bluetooth and WiFi communications, with available connection to a GPS module (system on a chip i.e., SOC), and local interface including speaker and pushbuttons for volume and acknowledgment, and for an emergency 'NOW" function that is geo-coded. The NOW function is a local part of Boxy in this case and the transmission is to the SmartPhone; Boxy recognizes a NOW event (e.g., assigned button push, other sensor input like mic input, etc.), retrieves the GPS signal if available and concatenates the GPS information with a NOW alert and notification that is configurable by the user and stored locally on Boxy and with a date and time stamp to send over the interface to the SmartPhone. It should be apparent to the user that other local features, such as a TFT/LCE/LED display and other technologies could be added, but not to the point where this would preclude the ease of use and the wearability of the Boxy device. It should also be apparent to those with electronics and computer hardware design experience that the Boxy Device could be built with other IoT (Internet of Things) computing devices like Arduino, ARM systems, et. al. that would not be of the Raspberry PI® foundation. Once connected to a network or Boxy Application Smart Phone cellular 'hot-spot' or other compatible communications network, then this establishes a geo-coded two-way connection necessary to implement the previous patents' (from which the instant application claims priority from) utility of notifying and alerting another smart phone and other communication channels such as 9-1-1, through a local and/or remote communications channel but with an additional meta-data that is a geo-code of location, with time stamp as the preferred method.

At first glance, the Boxy process and device's implementation may seem like a First Alert or any other commercial medical alert device with a push-button to signal to a remote station the 'I've fallen, and I can't get up . . . ', for example of an elderly fall victim. And more advanced versions of this implementation now come in watch format for active personnel in case a medical event occurs outside the home. However, the technology lacking in those other companies' implementations with these devices is still one of cut-in for direct notification with multiple modes of alert and broadcast that the Boxy process can provide.

The reason is that the only recipient of the notification and alert call of these other technologies is a subscriber services' call attendant whose primary role is to answer that call (a one-to-one direct relationship), whereas the primary role of the Boxy device described is to interrupt the current activity with a cut-in to notify that there is big trouble and to drop what you are doing to assist (a one-to-one to one-to-many indirect relationship). In any case, this other technology implementation still requires the additional need for service for a cell connection to someone to actually answer the panic call directly. The Boxy process does not—however, this does not preclude the Boxy device from having cellular service as the alert and notification method is distinct from the competition's' technology delivery method. This introduces the concept of a non-service connected wearable device connected to a WiFi, Bluetooth and/or other communications network hub, access point, router, etc. that does not require a service contract to join and access the network communications for the device if access is provided to the user utilizing the service, such as a campground, coffee shop, gym, park, backyard, neighbors, etc.

For the campground scenario, the key to solving this issue is to implement a Boxy process alert on a local primary channel group and extending the call for assistance by cut-in by previously described mechanisms to a subscriber on the local network of trusted devices, and/or also through the local WiFi/cloud to emergency services on a non-primary channel group. Also, via the previous patents' implementation, of non-primary channels, this opens up the availability of communication to emergency responders or authorities to canvas the area of the last known GPS without tipping off the abductor if they are perhaps monitoring the device.

But assuming that this Boxy device has also been 'ditched' by the perpetrator as discussed in the case of a cell phone, the key there is that on this Boxy device is a purpose-built alert and notification "NOW" button, that once depressed is active and an alert and notification is sent immediately and updated for geo-coded tracking if still available (still powered and not destroyed). The alert and notification sends geo-coded and time stamped GPS locations; with a cut-in notification method that like the previous patents' takes immediate priority on cut-in and over-rides current media to deliver the message. Parents can now call 9-1-1 independently and alert authorities, saving precious time in locating their child. In addition, the geo-coded alert can be displayed on any smart-phone application so equipped.

The Boxy application and Boxy device may also be utilized as a notification and alert device where a smart phone Boxy application could communicate to it in a far more practical and repeatable example, like a simple notification of a parent calling to a child wearing a Boxy device to return to the campground (note that notifications could also be informational, or entertaining in nature, i.e., a tweet, etc., or a message), or that a child has wandered outside of a geo-fenced zone, like getting too close to the river that the campground borders.

In fact, the Boxy process is a product suitable for both inside and outside, vacation, home, and office and even factory environments, and purpose built and designed to function in non-cellular networks as a two-way communication device. For example, another implementation could be for self-guided vendors at facilities who trigger an alert if outside of the permitted geo-coded "fenced" area.

As shown in FIG. 1, Boxy wearable devices may use a method of scanning (polling) or waiting for one of five main decision points 100, 101, 102, 109 and 111. Decision point 100 is the most serious case and a 'Yes' refers to the "NOW" pushbutton requesting immediate sending of a geo-coded (if available) alert and notification message to connected devices, both through primary and non-primary channels. The GPS module is accessed for GPS coordinates in 104. Note that if the local GPS device is inoperable, or if not equipped with GPS, a null shall be inserted in place of GPS coordinates and these shall be provided instead by less-accurate GPS coordinates supplemented from the Smart-Phone that may be several or tens of meters different from the actual alerting location, but still relatively close. The local speaker acts as a siren to startle the perpetrator in 105. If available, a local camera captures a snapshot image to send via a configured channel to the connected device in 106. If available, a local microphone live streams audio through a configured channel to the connected device in 107. The GPS coordinates (or GPS Null code) are combined with the alert and notification and a date and time stamp and will send to connected devices in 108. Decision point 109 checks if the NOW notification is reset by the proper means; Proper means in this case would be a reset algorithm to consider different combinations of input to the local Boxy including i) local only, ii) remote only and iii) a combination of a local and remote to reset this key function. For example, algorithm iii entails a combination for reset of Boxy NOW to be an input of a remote acknowledgment of the NOW message by the SmartPhone, followed by an input of significant time length NOW event deactivation, defined in the local Boxy such as pushing the local Boxy event button for greater than five seconds. "Proper means" could also mean algorithm ii) where remote acknowledgement only is required as input if so configured in ahead of time in the local Boxy that sent the NOW message. If Decision point 109 is a 'Yes' then the alarm is silenced, and the process is reset. Otherwise, If Decision point 109 is a 'No' the GPS coordinates are continually accessed/updated (or null) and resent with the alert and notification message and date and time stamp to connected devices as in 108.

If Decision point 100 is a 'No' then Decision point 101 is processed for any pending remote alert and notifications from a Boxy application activation device. If this Decision point 101 is a 'Yes' then a pending remote alert and notification message from connected activation devices, both through primary and non-primary channels is pending and shall be processed as per 110. There is a special case where a high priority over-ride is processed and bypasses all other activity to perform 110 UNLESS a local wearable device is in a NOW loop as shown in 104-109, in which case it is ignored until that devices NOW loop is reset by Decision point 109. This has the appropriate media pushed to the Boxy device in order to be activated and perform the desired action 110. These desired actions may include playing audio, displaying text, displaying graphics, delivering a vibration beeping, flashing, through the Boxy device, as well as other types of alerts. The alerts may be directed to various users through one common channel that every connected user may listen in to or through separate private channels for every user. Users may provide feedback, and this is checked for in Decision point 111 after receiving a notification. If a 'Yes', then feedback action shall be performed as per 112. The feedback action may also be sent through a common channel or through a private channel where only the notification sender can receive it. The feedback may be performed as an active decision of the user or as an automated response of the device, for example, GPS position coordinates. This branch of process execution (110, 111 and 112) is included for completeness in this utility patent application and is not new material; but claimed for the Boxy process and device. Refer to previous referenced patents for descriptions and details on these primary and non-primary channel performance of Desired Actions.

If Decision point 101 is a 'No' then Decision point 102 is processed for any pending local actions and/or Boxy device functions. Decision point 102 pending local actions and/or Boxy device functions processing takes place if this Decision point 102 is a 'Yes' then any local actions from the Boxy device user, for example, raising or lowering the volume, muting the volume, connecting and pairing Bluetooth headphones, connecting another peripheral device, or creating a text and/or audio and/or photo-based message to send, are performed per 103 as per the context of the command type input from either a physical button push, and/or other Boxy Device User Interface (UI) method that is well known to the current state of the art designers and implementors including gestures, typing, shorthand, etc. If this Decision point 102 is a 'No' then the major Decision point path is complete and waits (polls) for re-initiation to Start again.

Figure 2:
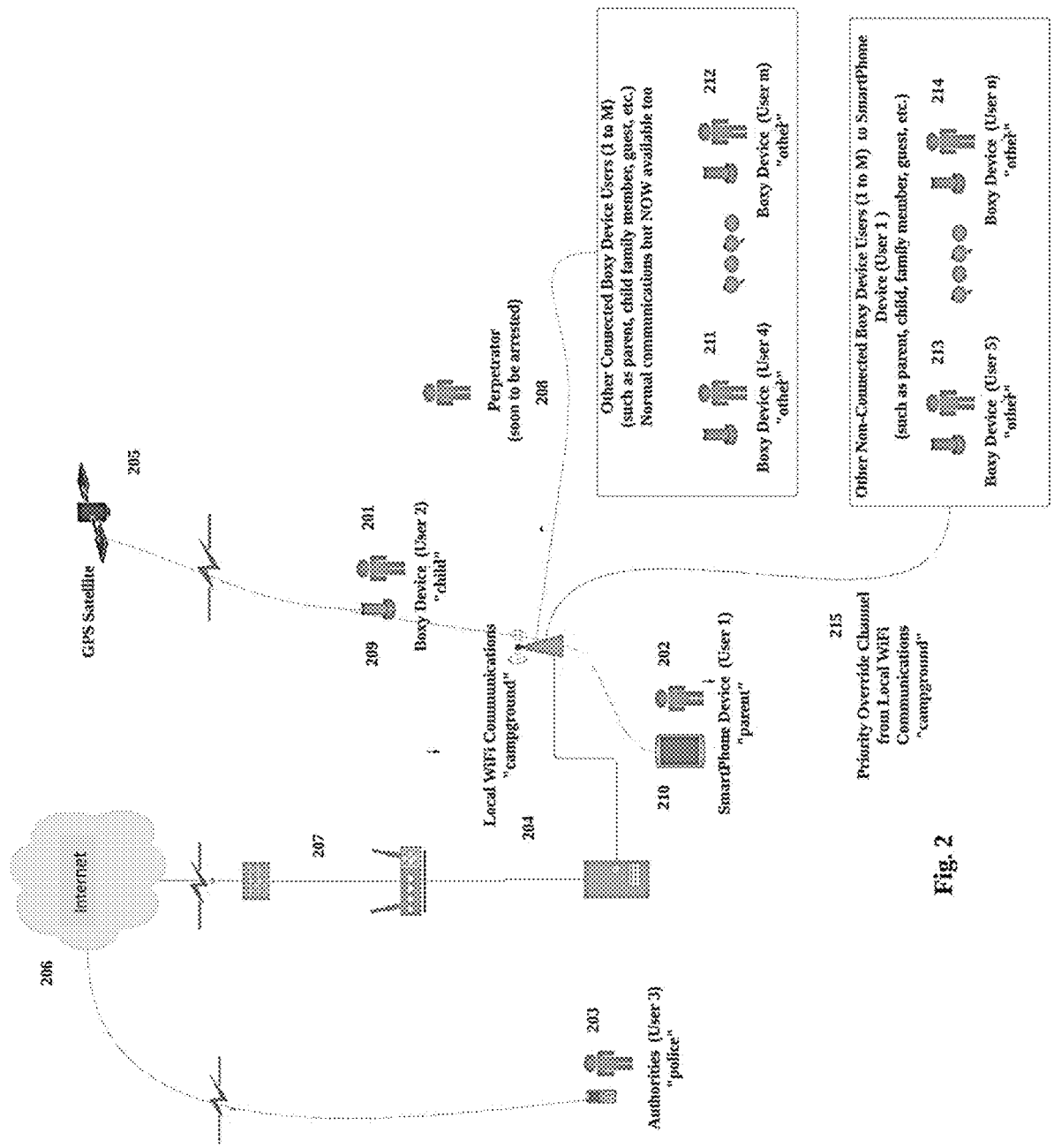
FIG. 2 shows an embodiment of the present Boxy process in accordance with the principles of the present disclosure.

FIG. 2 shows an embodiment of the present invention for a campground scenario of alert and notification comprising wearable Boxy device worn by user 201, aka "User 2 child". User 202 aka "User 1 parent" with a Boxy application installed on a SmartPhone, is paired to user 201 by the local WiFi communications aka "campground" and communications are enabled on a primary channel. If a perpetrator (208) attempts to abduct user 201, this user pushes a 'NOW' button to initiate the alerting and notification messaging and other potential actions as found in the process flowchart of FIG. 1. The precise location is accessed from the GPS satellite (205) with an on-board Boxy device internal GPS chip (209) and processed as meta-data and attached to the alert and notification that is sent to the Local WiFi campground (204, 207, and 206) and User 1 (202). Note that if the local Boxy internal GPS chip (209) is inoperable, or if not equipped with an internal GPS chip, a null code shall be inserted in place of GPS coordinates by the Boxy device. When the alert and notification NOW message is received in that case by User 1 (202), the GPS null code received shall be replaced with a set of less-accurate SmartPhone Boxy Application proxy GPS coordinates from the SmartPhone that User 1 (202, 210) holds. While this may be several or tens of meters different from the actual alerting location of User 2 (201, 209), it is still relatively close (201, 210). User 1 (202) may also call the authorities (User 3 203) directly on their Smartphone via a 9-1-1/other emergency number or if previously configured, the Boxy application on the SmartPhone device may send a non-primary channel message to authorities (user 203) via 9-1-1 formatted in text-to-speech to state where the emergency is, the type, fastest directions via GPS lookup, and the parents (User 1 202) phone number. The Boxy application that resides on the Smartphone (User 1 202) allows the regular communications to alert and notify the User 2 (201) (except not through the priority override channel, only through other normal addressable channels so the alert stays active) but may also be preconfigured to take advantage of the complete functions of a SmartPhone, whereas Boxy device will be limited in comparison. Only an agreed protocol, potentially a "vote" reset algorithm from both the SmartPhone Boxy Application of User 1 202 and the initiating and active Boxy Device of User 2 201, resets the Boxy Device of User 2 201 that initiated the "NOW" type of message alert, and stops that Boxy device from resending updated geo-coded alert and notification messages.

A secondary, related communications group may also exist at the "campground". For example, Other Connected Boxy Device Users (various people, User 4 211, User m 212) belonging to the same connected group as User 1 are still able to function in a normal manner yet unaware of the situation facing User 2 (201). This is rectified by User 1 (202) either manually forwarding OR configuring the Boxy Smartphone application to automatically relay and broadcast the message to everyone that is connected to the group (various people, User 4 211, User m 212). This secondary group is not required to achieve the core functionality but expands it to broadcast to a semi-private set of connected Boxy devices.

A third, unrelated communications group may also exist at the "campground". For example, Other Non-Connected Boxy Device Users (various people, User 5 213, User n 214) not belonging to the same connected group as User 1 are still able to function in a normal manner yet unaware of the situation facing User 2 (201). This is a situation where other families are using Boxy devices and SmartPhone Applications separately from the main Users 1 and 2 (202, 201). This is rectified by User 1 (202) either manually forwarding OR configuring the Boxy Smartphone application to automatically relay and broadcast the message to a Priority Override Channel (215) so that everyone connected to the campground wireless access point (204) receives an immediate priority alert and notification message that overrides normal activity and alerts for both Other Connected and Other Non-Connected groups (various people, User 4 211, User m 212, User 5 213, User n 214). This third group is not required to achieve the core functionality but expands it to a high alert and notification message on a Priority Override Channel (215) to all Boxy devices.

It will be apparent to person skilled in the art that other variations of these embodiments could be constructed according to the state of the art and the teachings in this disclosure. For example, the routing function could combine with other routing functions on separate primary communication channels to form super-user-communities, for instance fan clubs in different cities listening to an on-line concert for a famous rock band, and then being able to have communications with the band if they win a contest on a private non-primary communications channel for a backroom chat. Also, the ability to combine non-primary groups could continue by forming non-primary groups within non-primary groups, and many unusual combinations based on subscription and/or communications needs.

The disclosure is not limited to the precise configuration described above. While the disclosure has been described as having a preferred design, it is understood that many changes, modifications, variations and other uses and applications of the subject invention will, however, become apparent to those skilled in the art without materially departing from the novel teachings and advantages of this disclosure after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

What is claimed is:

1. A method for alert and/or notification, comprising:
sending, via a primary media channel on at least one wearable non-service provided media device, a geo-coded alert for the purposes of identification of a location and tracking of the device via an addressable communication pathway to a service-provided device;
wherein the geo-coded alert can be provided locally from the at least one wearable non-service provided media device or remotely from a connected service-provided device;
wherein said at least one wearable non-service provided media device is operatively connected to an activation method and/or command trigger;
wherein said at least one wearable non-service provided media device comprises a notification protocol;
wherein said notification protocol is initiated via activation and/or command trigger by the wearable non-service provided media device.

2. The method for alert and/or notification of claim 1, wherein said at least one wearable non-service provided media device is operatively connected to an activation device via the addressable communication pathway; and
wherein said notification protocol, if available, sends a snapshot image via a command trigger by the wearable media device activation method that has the wearable media device take a still frame camera/video image and sends the image to a service-provided device that is connected.

3. The method for alert and/or notification of claim 1, wherein said notification protocol, if available, sends a live audio stream via a command trigger by the wearable media activation device method to a service-provided device that is connected.

4. The method for alert and/or notification of claim 2, wherein:

said notification protocol is initiated via a command trigger by the at least one wearable non-service provided media device to a service-connected device that is connected to a local area network;

said at least one wearable non-service provided media device comprises a notification protocol connected to said local area network and connected directly to the service-connected device but not including the initiating wearable non-service provided media device;

said at least one wearable non-service provided media device comprises a notification protocol connected to said local area network but not directly to the service-connected device;

wherein said notification protocol, if available, relays the known information in the alert and notification message from the initial non-service provided wearable media device and broadcasts this to the potential two groups of both connected and not connected non-service wearable media devices through a priority over-ride channel.

5. The method for alert and/or notification of claim 1, wherein, said where the one wearable non-service provided media device has an internal GPS device that is unavailable and is operatively connected to an activation device via an addressable communication pathway;

wherein a null code may be inserted when the alert and notification is sent;

wherein the receiving service-provided device that is connected provides a proxy GPS coordinates set to replace the null code from the sending and wearable non-service provided media device that has an internal GPS device that is unavailable.

6. A method for alert and/or notification, comprising:

sending, via a priority override channel on at least one non-connected Boxy device, a geo-coded alert for the purposes of identification of a location and tracking of the non-connected Boxy device via an addressable communication pathway to one or more of secondary non-connected devices;

wherein at least one primary connected Boxy device is operatively non-connected to an activation and/or command trigger;

wherein said one or more of the secondary non-connected devices comprise a notification protocol;

wherein said notification protocol is initiated via activation and/or command trigger by a wearable non-service provided media device.

7. A method for alert and/or notification, comprising:

sending, via at least one primary connected Boxy device, a geo-coded alert for the purposes of identification of a location and tracking of a non-connected Boxy device via an addressable communication pathway to one or more of secondary connected devices;

wherein said at least one primary connected Boxy device is operatively connected to an activation and/or command trigger;

wherein said one or more of the secondary connected devices comprise a notification protocol;

wherein said notification protocol is initiated via activation and/or command trigger by a wearable non-service provided media device.

\* \* \* \* \*